United States Patent [19]
Graafmans

[11] 3,731,998
[45] May 8, 1973

[54] REMOTE FOCUSING ASSEMBLY

[75] Inventor: Hans Graafmans, Huntington Beach, Calif.

[73] Assignee: Technicolor, Inc., Hollywood, Calif.

[22] Filed: May 14, 1971

[21] Appl. No.: 143,447

[52] U.S. Cl. ................................. 352/140, 95/45
[51] Int. Cl. .................................... G03b 3/00
[58] Field of Search ................... 95/45; 352/139, 140

[56] References Cited

UNITED STATES PATENTS

| | | | |
|---|---|---|---|
| 1,620,768 | 3/1927 | Joy | 352/140 |
| 3,520,596 | 7/1970 | O'Donnell | 352/139 X |

*Primary Examiner*—John M. Horan
*Attorney*—Lyon & Lyon

[57] ABSTRACT

There is disclosed herein a remotely operable focusing assembly for motion picture projectors and the like. In certain types of motion picture projectors and motion picture viewers, the placement of the optical system and projector lens is such that it is difficult to provide a suitable linkage or arrangement for moving the lens for focusing purposes. The present assembly includes a relatively simple pivotally mounted arm with an eccentric drive at one end for moving a relatively short-throw lens at the other. The arrangement is such that the arm may be bent or otherwise disfigured so as to pass over, under, or around obstructions within the projector. The arrangement allows a substantial amount of eccentric rotation in obtaining full travel of the lens to thereby allow fine adjustment of focus.

6 Claims, 3 Drawing Figures

PATENTED MAY 8 1973 3,731,998

INVENTOR.
HANS GRAAFMANS
BY Lyon & Lyon
ATTORNEYS

REMOTE FOCUSING ASSEMBLY

This invention relates to a focusing assembly for lens and more particularly to a novel focusing assembly for moving the lens of a motion picture projector.

CROSS REFERENCE TO RELATED APPLICATION

Reference is made to application Ser. No. 1184 filed Jan. 7, 1970, in the name of G. C. Caraway, entitled "FOCUSING ASSEMBLY FOR PROJECTORS," and to the patents cited therein. This application describes a novel focusing assembly for motion picture projectors and the like, the disclosure of which is incorporated herein by reference.

Reference also is made to application Ser. No. 143,446, filed concurrently herewith, in the name of E. Robak, entitled "FOLDING MIRROR AND SCREEN ASSEMBLY FOR PROJECTOR," the disclosure of which is incorporated herein by reference. This latter application discloses a motion picture viewer employing a folding mirror and screen arrangement upon which images from the present lens and focusing assembly may be displayed.

In various types of motion picture projectors and motion picture viewers, the optical system is located such that it is difficult to provide a suitable linkage for allowing remote focusing of the lens of the optical system. This is particularly true of compact projectors and viewers where the focusing lens may be positioned away from the sides, bottom or top of the projector. Additionally, the problem is compounded where a relatively short-throw focusing lens is involved; that is, a lens which requires a relatively small movement for providing the full range of focus adjustment.

Accordingly, it is a principal object of the present invention to provide an improved focusing assembly for a lens.

An additional object of this invention is to provide a relatively simple remote focusing arrangement for a motion picture projector lens.

An additional object of this invention is to provide a remote focusing arrangement for a lens of a motion picture projector wherein the same can be configured to extend about obstructions within the projector.

These and other objects and features of the present invention will become better understood through a consideration of the following description taken in conjunction with the drawing in which.

Figure 1:
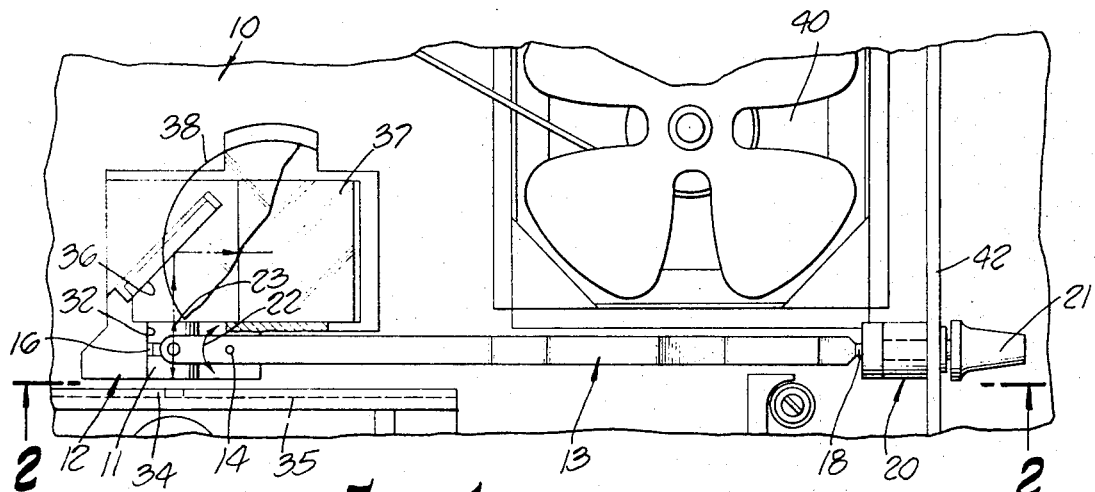
FIG. 1 is a plan view of a portion of a motion picture viewer incorporating a remote focusing assembly of the present invention.

Turning now to the drawing, FIG. 1 illustrates a remote focusing assembly for a motion picture viewer 10 including a moveable projection lens 11 of a lens assembly 12. Briefly, an elongated arm 13 is pivotally mounted at 14 and has a finger 15 (FIG. 2) on one end engaging a peripheral groove 16 on the periphery of the lens 11. An exemplary arm may be approximately 6 to 7 inches long, with the pivot 14 being about ½ to 1 inch from the left end of the arm for use with a lens 11 having a full focusing throw of about 1/16 inch.

The other end of the arm 13 includes a finger 18 positioned within an off-set aperture 19 (FIG. 3) in an eccentric 20. A knob 21 is affixed to the eccentric 20 and allows rotation thereof about a central axis 21 as seen in FIG. 3. Rotary motion of the knob 21 swings the arm 13 about the pivot point 14 as indicated by arrows 22 thereby linearly moving the lens 11 as indicated by arrows 23. The arm 13 may be bent or configured as at 25–26 in FIG. 2 to prevent the same from striking or otherwise rubbing against obstructions within the projector.

The viewer 10 may include a baseplate 30 to which the lens assembly 12 is secured. The lens assembly 12 includes a block or body 31 having an elongated "V" type slot or channel 32 within which the cylindrical body of the lens 11 rides in a reciprocal fashion as indicated by arrows 23. The lens 11 picks up images from film (not shown) at a film plane 34 defined by a film gate 35. Light from a source is caused to shine through the film within the film gate 35 and through the lens 11 to a first mirror 36. The image is then directed from the first mirror 36 to a second mirror 37, and from there through a lens 38 upwardly. The image may then be reflected by a third mirror onto a back projection screen, not shown, for viewing as more fully described in said Robak application. The film is moved by a conventional claw feed assembly driven by a motor 40.

Figure 2:
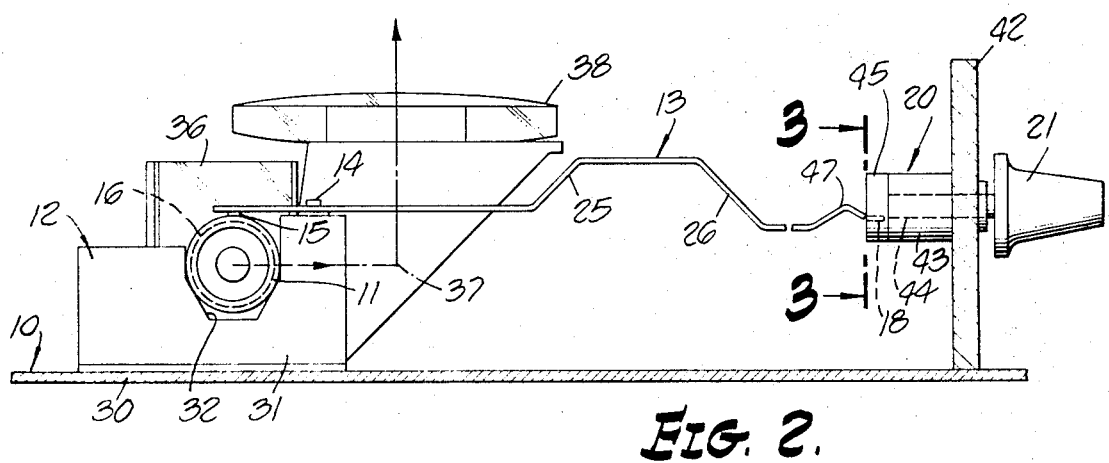
FIG. 2 is an elevational view taken along a line 2—2 of FIG. 1.
Figure 3:
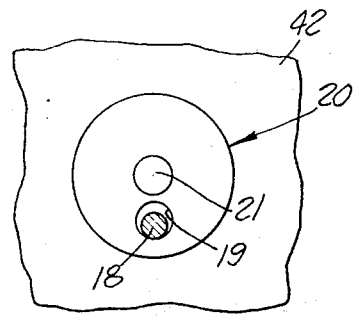
FIG. 3 is a view of the eccentric drive for the focusing assembly taken along a line 3—3 of FIG. 2.

The viewer includes an upstanding side 42 as seen in FIG. 2. The eccentric 20 includes a body 43 secured to the side 42. The knob 21 is connected by a shaft 44 to a cam plate 45 of the eccentric 20 within which the aperture 19 is disposed. The finger 18 extends into the aperture 19 as explained earlier, and the right end of the arm may be bent upwardly at 47 to a point substantially coincident with the central axis 21 of the eccentric 20. Although not shown for facilitating illustration, in various types of projectors there may be obstructions, such as film guides, sound pick-up assemblys or the like mounted in the way of the arm 13. In this case, the arm 13 can be suitably bent or configured as illustrated at 25–26 so as to extend above, below, or around such obstructions, while still transmitting proper motion to move the lens 11 for focusing.

The present embodiments of this invention are to be considered in all respects as illustrative and not as restrictive, the scope of the invention being indicated by the appended claims rather than by the foregoing description. All changes which come within the meaning and range of equivalency therefore are intended to be embraced therein.

What is claimed is:

1. A focusing assembly for motion picture projectors and the like having a movable lens reciprocally mounted in a holder comprising
   mounting means,
   a lens holder positioned on said mounting means, said lens holder containing a lens and including a body having an elongated channel therein for holding and allowing reciprocal movement of the lens, said lens having an aperture in the periphery thereof,
   an elongated arm pivotally mounted intermediate the ends thereof, a first end of said arm having a finger engaging said aperture in said lens for reciprocally positioning said lens, and
   eccentric means mounted on said mounting means with its axis traverse to the axis of the pivotal mounting of said arm, said eccentric means engaging the other end of said arm to swing said arm about said pivoted mounting for causing movement of said lens, said eccentric means including an eccentric plate having an aperture offset from the axis thereof, and said other end of said arm having a finger engaging said aperture of said eccentric plate.

2. An assembly as in claim 1 wherein said elongated arm is several inches long and is configured to prevent the same from engaging obstructions within a projector.

3. a focusing assembly for motion picture projectors, viewers and the like having a moveable lens reciprocally mounted in a holder comprising
   a lens holder containing a reciprocally moveable lens assembly, said lens assembly being positioned in an elongated channel of said holder and said assembly having a peripheral aperture,
   an elongated arm pivotally mounted intermediate the ends thereof, a first end of said arm engaging said aperture of said lens assembly for reciprocally positioning said lens within said holder for focusing of an image projected by said lens assembly, and
   eccentric means mounted remotely from said lens assembly and having an axis of rotation traverse to the axis of the pivotal mounting of said arm, said eccentric means including an eccentric plate having an aperture offset from the axis of rotation thereof with the aperture of said plate engaging the other end of said arm to swing said arm about said pivotal mounting for causing reciprocal movement of said lens.

4. An assembly as in claim 3 wherein
   mounting means are provided within a projector to which said lens holder and said eccentric means are mounted, said projector including components obstructing a direct line path form said eccentric means to said lens assembly, and
   said elongated arm is configured to prevent the same from engaging said components in said projector.

5. An assembly as in claim 3 wherein
   said other end of said arm includes a finger engaging said aperture in said eccentric plate, said arm means being bent upwardly from said finger to a point substantially coincident with the axis of rotation of said eccentric plate, and
   said first end of said arm includes a finger engaging an annular aperture about the periphery of said lens assembly.

6. A focusing assembly for motion picture projectors and the like having a movable lens reciprocally mounted in a holder comprising
   mounting means,
   a lens holder positioned on said mounting means, said lens holder containing a lens,
   an elongated arm pivotally mounted intermediate the ends thereof, a first end of said arm engaging said lens for reciprocally positioning said lens, and
   eccentric means mounted on said mounting means with its axis traverse to the axis of the pivotal mounting of said arm, said eccentric means engaging the other end of said arm to swing said arm about said pivoted mounting for causing movement of said lens, said eccentric means including an eccentric plate having an aperture offset from the axis thereof, and said other end of said arm having a finger engaging said aperture of said eccentric plate.

* * * * *